July 12, 1949.     W. C. NABORS     2,475,716
ADJUSTABLE POWER-OPERATED TRAILER MOWER
Filed Jan. 24, 1947     3 Sheets-Sheet 1
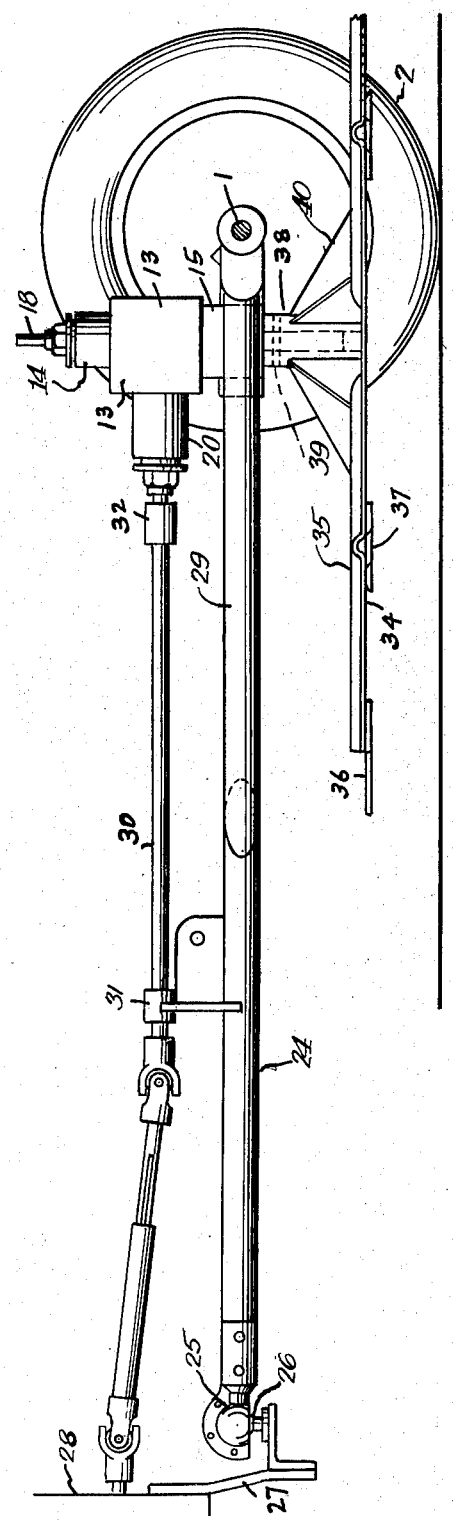
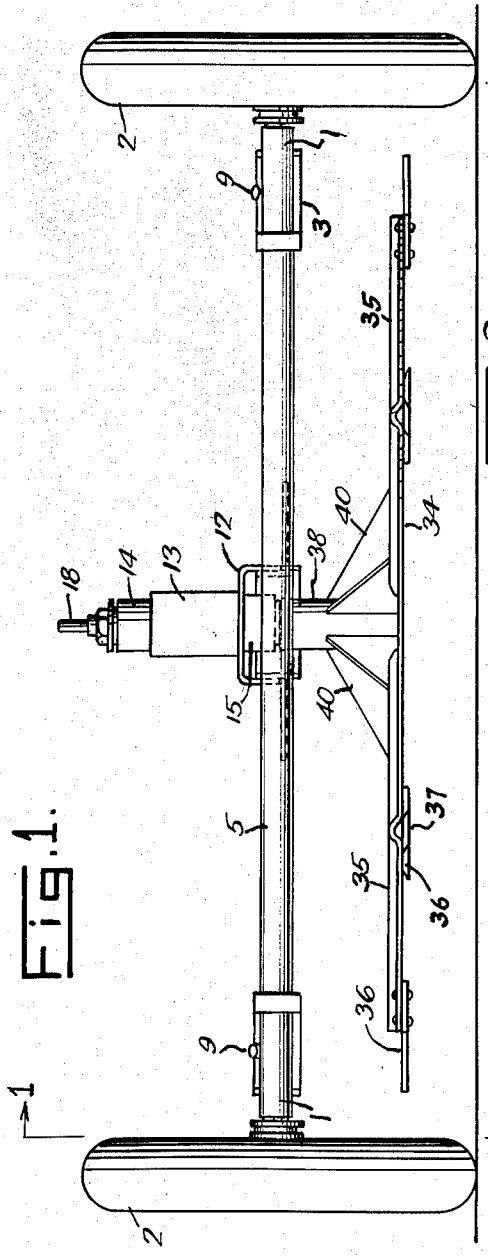
Inventor
William C. Nabors
By
E. V. Hardway,
Attorney

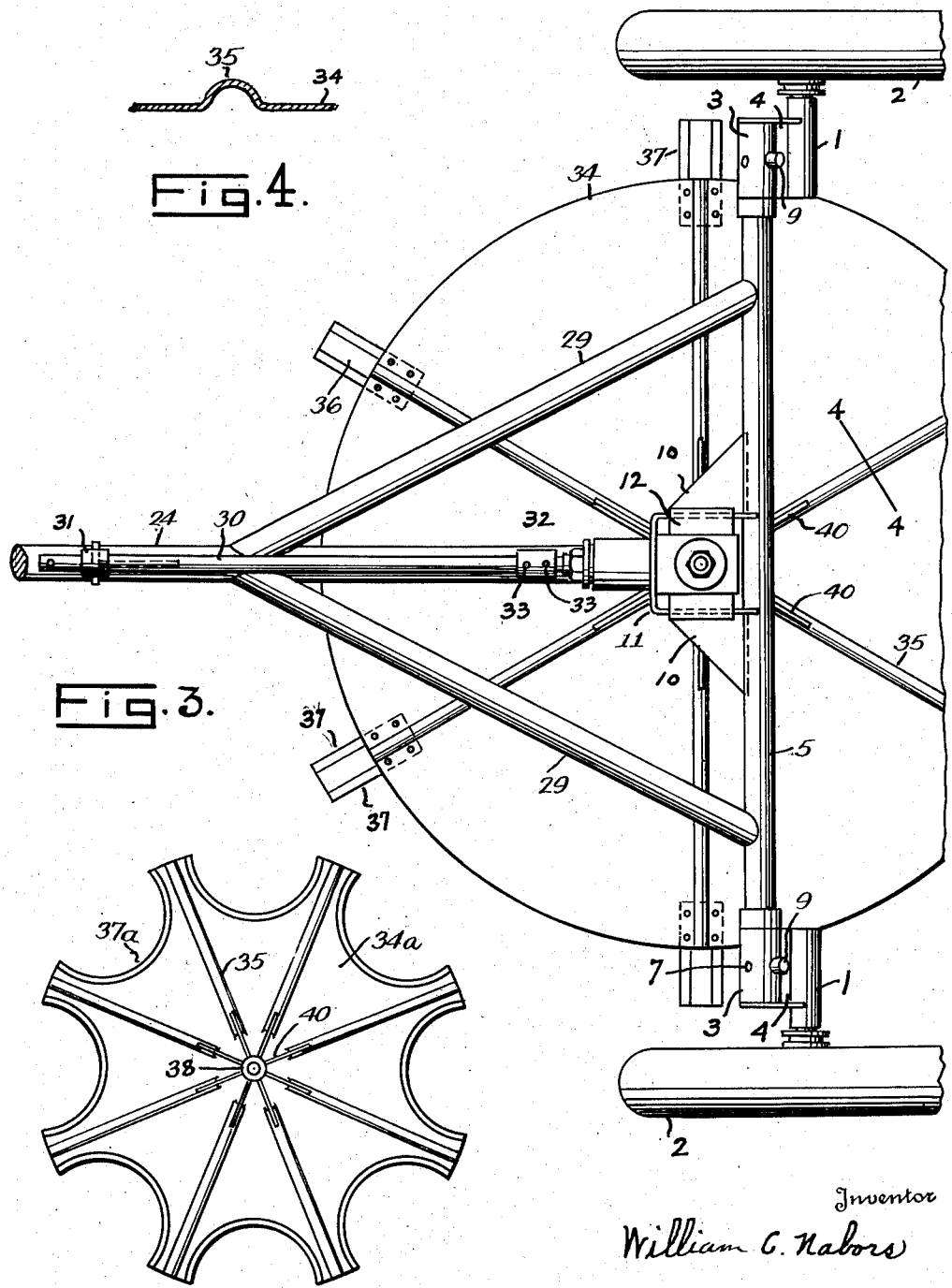

July 12, 1949.  W. C. NABORS  2,475,716
ADJUSTABLE POWER-OPERATED TRAILER MOWER
Filed Jan. 24, 1947  3 Sheets-Sheet 3

Inventor
William C. Nabors
By E. V. Hardway.
Attorney

Patented July 12, 1949

2,475,716

UNITED STATES PATENT OFFICE 2,475,716

ADJUSTABLE POWER-OPERATED TRAILER MOWER

William C. Nabors, Mansfield, La.

Application January 24, 1947, Serial No. 724,071

7 Claims. (Cl. 56—25.4)

1

This invention relates to an adjustable power-operated trailer mower.

An object of the present invention is to provide equipment of the character described which embodies novel driving means specially adapted for driving either a rotatable disc-like cutter as well as for driving a broadcasting spreader particularly designed for broadcasting fertilizer.

It is another object of the present invention to provide a novel type of trailer equipped with driving mechanism adapted to be driven by the tractor and which may be utilized for driving a horizontal rotatable cutter or for operating a spreader for fertilizer, or the like, or for other similar purposes.

A further object of the invention is to provide a trailer of the character described for supporting and driving the equipment referred to, or other equipment, and which is adjustable vertically so that the driven equipment may be correspondingly adjusted.

The invention also embodies means for controlling the volume of material being broadcast.

With the above and other objects in view the invention has particular relation to certain novel features of construction, operation and arrangement of parts, examples of which are given in this specification and illustrated in the accompanying drawings, wherein:

Figure 1 is a side view of the trailer equipped with a cutter disc and shown in section taken on the line 1—1 of Figure 2.

Figure 2 is a rear view thereof.

Figure 3 is a plan view partly broken away.

Figure 4 is an enlarged, fragmentary, sectional view taken on the line 4—4 of Figure 3.

Figure 5 is a reduced plan view of another form of cutter disc.

Figure 7:
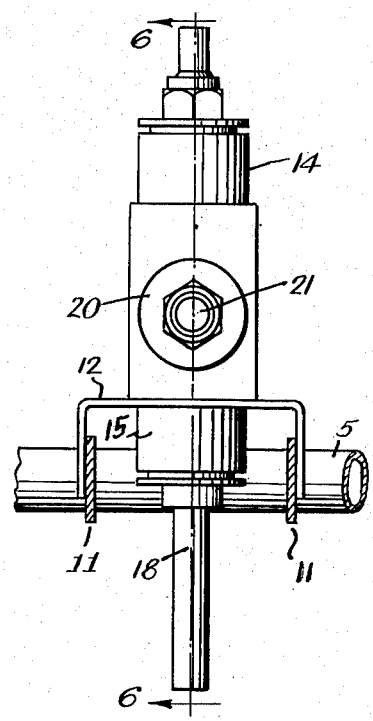
Figure 7 is an enlarged, front elevation of said assembly.
Figure 6:
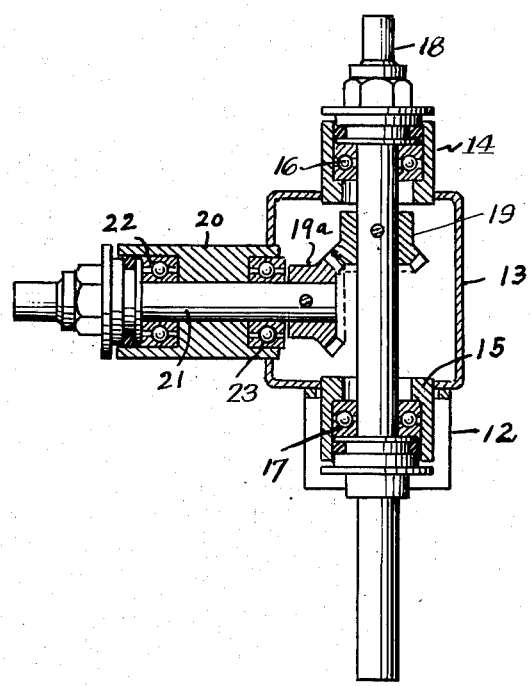
Figure 6 is an enlarged, vertical, sectional view of the transmission assembly taken on the line 6—6 of Figure 7.
Figure 8:
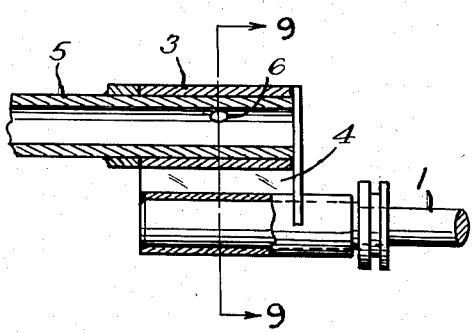
Figure 8 is an enlarged, fragmentary, horizontal, sectional view of the trailer axle.

Referring now more particularly to the drawings wherein like numerals of reference designate the same parts in each of the figures, the numerals 1, 1 designate the wheel spindles on which the ground wheels 2, 2 are mounted.

Supported by the inner ends of these spindles and offset forwardly therefrom there are the sleeves 3, 3 which are in transverse alignment.

2

These sleeves are anchored in place, with respect to the spindles, by suitable brackets, as 4, 4.

The numeral 5 designates the trailer axle whose ends extend into the respective sleeves 3.

Each end of the axle has aligned pin bearings 6 therethrough and the corresponding sleeves 3 have two pairs of bearings, as 7 and 8. The bearings 7 are at approximately right angles to the bearings 8.

Figure 9:
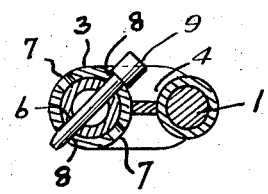
Figure 9 is a cross-sectional view thereof taken on the line 9—9 of Figure 8.

As is illustrated in Figure 9, the bearings 6 of the axle are in alignment with the bearings 8 of the corresponding sleeve 3 with the pins 9 inserted through said registering bearings. It is obvious, however, that the axle 5 may be lowered by removing the pins 9 and lowering the axle until the bearings 7 register with the bearings 6 of the axle and then reinserting the pins 9.

The axle 5 and the equipment supported thereby may thus be readily elevated or lowered relative to the ground surface.

Anchored to, and extending forwardly from, the axle 5 are the angle plates 10, 10 which are spaced apart, one on each side of the center of the axle, and secured to, and extending forwardly from the axle, there is a U-shaped bracket 11 which is reinforced and strengthened by the angle plates 10 and which, in turn, support an inverted U-shaped table 12.

These parts 10, 11 and 12 are, preferably, welded to the axle and to each other to form a firm support for the transmission.

The numeral 13 designates a transmission case having upper and lower bearing sleeves 14 and 15 welded thereto the latter of which extends through a central opening in the table 12. The transmission case 13 is supported on, and preferably welded to, the table 12.

The sleeves 14 and 15 enclose suitable bearing assemblies 16 and 17 for the vertical shaft 18 which is mounted to rotate in said assemblies and fixed on this shaft, within the gear case 13, there is a bevel gear 19 which is in mesh with a bevel gear 19a also located within the gear case.

Anchored to the forward side of the gear case 13 and extending forwardly therefrom there is a bearing housing 20 through which the shaft 21 extends forwardly. The bevel gear 19a is fixed on the rear end of this shaft 21 and said shaft is mounted to rotate in the front and rear bearing assemblies 22 and 23 in said housing.

There is a reach pole 24 whose forward end is formed with a socket coupling 25 to receive an upstanding socket 26 on the bracket 27 which is connected to the rear end of the "jeep," or other tractor, 28. The rear end of this reach pole may be suitably welded to the depending sleeve 15 of the gear case 13. This reach pole is reinforced and strengthened by the angle braces 29, 29 which are welded at their forward ends to the reach pole and at their rear ends to the axle 5, as best shown in Figures 3 and 12; said axle, reach pole and angle braces forming a supporting frame.

There is a flexible drive shaft 30 which is operatively connected with the motor of the tractor and which works in a suitable bearing 31 which is secured to and upstands from, the reach pole. The rear end of this shaft 30 is adjacent, and in alignment with, the shaft 21 and they are connected in driving relation by means of a sleeve 32 which telescopes over, and is pinned to, said respective shafts by means of the pins 33, 33, as shown also in Figures 3 and 12.

The vertical shaft 18 is therefore geared to and driven by the shaft 21 which, in turn, is driven from the tractor motor through the drive shaft 30.

The numeral 34 designates a disc which is provided with the radial corrugations 35, for strength, and secured to the margins of the disc and extending outwardly therefrom there are the cutter blades 36 which are in alignment with said corrugations and which have cutting edges 37 on each margin so that they will cut in either direction; that is whether the disc is rotating in one direction or the other.

This disc has a central upstanding hub 38 which may be fitted over the lower end of the vertical shaft 18 and may be keyed thereto by means of a cross key, as 39.

The disc is additionally strengthened by the angle plates 40 which may be welded to the hub 38 and to the upper side of said disc, preferably to the corrugations 35 thereof, as illustrated in Figure 3.

Equipped with the cutter the implement is specially designed for cutting grass, weeds or other coarse growth and as the tractor and trailer move forwardly the cutter disc and cutters will be rotated at a high rate of speed so that the ground will be cleared.

The disc-like cutter may cut at the elevation shown in the drawings but if it should be desired to make the cut closer to the surface of the earth the pins 9 may be removed and the axle 5 lowered until the sleeve bearings 7 are aligned with the axle bearing and said pins reinserted. This will bring the axle to a lower level and the cutter disc and cutters closer to the ground surface.

An alternative form of rotatable cutter is shown in Figure 5 wherein the margin of cutter disc 34a is formed arcuate between the corrugations 35 and formed with the arcuate cutting edges 37a.

The type of disc shown in Figure 5, in other respects, is similar to that shown in Figure 3 and is mounted and driven in the same manner.

The rotatable cutter 34 or 34a may be readily removed by removing the pin 39 and the trailer then used for other purposes.

The drawings and description are illustrative merely while the broad principle of the invention will be defined by the appended claims.

What I claim is:

1. In equipment of the character described a carriage comprising, aligned wheel spindles; ground wheels mounted thereon; axle bearings carried by, and offset axially relative to, the spindles; a frame including an axle whose ends are supported by, and rotatable relative to, said bearings, a reach pole connected to the axle; means for securing the axle against rotation relative to the bearings but releasable to permit such rotation.

2. In equipment of the character described a carriage comprising, aligned wheel spindles; ground wheels mounted thereon; axle bearings carried by, and offset axially relative to, the spindles; a frame including an axle whose ends are supported by, and rotatable relative to, said bearings, a reach pole connected to the axle; removable means through said axle and bearings for securing the axle against rotation relative to the bearings but releasable to permit such rotation, a transmission mechanism supported on the frame and having a vertical power takeoff shaft adapted to be connected to mechanism to be driven thereby.

3. In equipment of the character described a carriage comprising, a pair of transversely aligned spindles, ground wheels mounted on the spindles, an axle bearing on each spindle, an axle whose ends are in telescopic relation with said bearings, a forwardly extending reach pole connected to the axle, a transmission mechanism supported by the axle and including a vertical transmission shaft, said bearings being rotatable relative to the axle to permit the raising or lowering of the axle and transmission mechanism and a pin through each bearing and the axle for securing the axle and bearings against relative rotation.

4. In equipment of the character described a carriage comprising, aligned wheel spindles; ground wheels mounted thereon; axle bearings carried by, and offset axially relative to, the spindles; a frame including an axle whose ends are supported by, and rotatable relative to, said bearings and a reach pole connected to the axle and extended forwardly and adapted to be connected to a tractor vehicle, said bearings being adjustable about the axle; means securing the bearings at selected points of adjustment; a transmission mechanism supported on said frame and including a vertical power takeoff shaft adapted to be connected to mechanism to be driven thereby, and a drive shaft adapted to be driven from the tractor motor and operatively connected with the transmission mechanism and effective to drive said mechanism.

5. Equipment of the character described comprising, a carriage having ground wheels and a frame mounted thereon, said frame including a reach pole adapted to be connected to a tractor vehicle, means through which the frame may be adjusted vertically with respect to the ground wheels and fixed at a selected point of adjustment, a transmission mechanism supported on the frame and including a vertical power takeoff shaft, a drive-shaft adapted to be driven from the tractor motor and in driving relation with the transmission mechanism for rotating said power takeoff shaft and a cutter disc having cutters thereon mounted on the lower end of the power takeoff shaft to rotate in an approximately horizontal plane.

6. Equipment of the character described comprising, a carriage including ground wheels and a frame mounted thereon, said frame including a reach pole adapted to be connected to a tractor vehicle, a transmission mechanism supported on the frame and including a vertical power takeoff shaft, a drive-shaft operatively connected with the transmission mechanism and adapted to be driven from the tractor motor to rotate the power takeoff shaft, a rotatable cutter mounted on the lower end of the power takeoff shaft, means for vertically adjusting the frame relative to the ground wheels to vary the plane of rotation of the cutter relative to the supporting surface and means for positively fixing the selected point of adjustment.

7. In equipment of the character described a carriage comprising, a pair of transversely aligned spindles, ground wheels mounted on the spindles, sleeves secured to the inner ends of the spindles and forwardly offset therefrom and in transverse alignment, said sleeves being anchored to the spindles, an axle whose ends extend into the respective sleeves, said sleeves being rotatable about the axle to allow the vertical adjustment of the axle with respect to the ground wheels, means for fixing the sleeves on the axle at a selected point of adjustment, a forwardly extended reach pole connected to the axle, a transmission mechanism supported by the axle and including a vertical transmission shaft adapted to be connected to the mechanism, supported by the axle, to be driven by said shaft.

WILLIAM C. NABORS.

REFERENCES CITED

The following references are of record in the file of this patent:

UNITED STATES PATENTS

| Number | Name | Date |
| --- | --- | --- |
| 697,210 | Krauss | Apr. 8, 1902 |
| 1,570,825 | Coburn | Jan. 26, 1926 |
| 2,281,639 | Swan | May 5, 1942 |
| 2,329,185 | Coddington | Sept. 4, 1943 |
| 2,344,663 | Wood | Mar. 21, 1944 |
| 2,429,492 | Scranton | Oct. 21, 1947 |